(12) United States Patent
Saigo et al.

(10) Patent No.: US 12,280,823 B2
(45) Date of Patent: Apr. 22, 2025

(54) DRIVING ASSISTANCE SYSTEM

(71) Applicant: TOYOTA JIDOSHA KABUSHIKI KAISHA, Toyota (JP)

(72) Inventors: Shintaro Saigo, Nisshin (JP); Takeshi Hamaguchi, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 128 days.

(21) Appl. No.: 18/453,426

(22) Filed: Aug. 22, 2023

(65) Prior Publication Data
US 2024/0101194 A1 Mar. 28, 2024

(30) Foreign Application Priority Data
Sep. 26, 2022 (JP) ................. 2022-152507

(51) Int. Cl.
| | | |
|---|---|---|
| *B60W 30/10* | (2006.01) | |
| *B60W 30/12* | (2020.01) | |
| *B60W 50/08* | (2020.01) | |
| *B60W 60/00* | (2020.01) | |
| *B62D 6/00* | (2006.01) | |
| *B62D 15/00* | (2006.01) | |
| *B62D 15/02* | (2006.01) | |

(52) U.S. Cl.
CPC .......... *B62D 15/025* (2013.01); *B60W 30/10* (2013.01); *B60W 30/12* (2013.01); *B60W 50/082* (2013.01); *B60W 60/005* (2020.02); *B62D 6/002* (2013.01); *B62D 15/021* (2013.01)

(58) Field of Classification Search
CPC .... B60W 30/10; B60W 30/12; B60W 50/082; B60W 60/005; B60W 60/0051; B60W 60/0052; B62D 5/0463; B62D 6/002; B62D 6/003; B62D 15/021; B62D 15/0215; B62D 15/022; B62D 15/0225; B62D 15/023; B62D 15/0235; B62D 15/025
USPC ........................................... 701/41
See application file for complete search history.

(56) References Cited

U.S. PATENT DOCUMENTS

| | | |
|---|---|---|
| 7,692,534 B2 | 4/2010 | Kataoka et al. |
| 8,352,124 B2 | 1/2013 | Taguchi |
| 8,682,500 B2 | 3/2014 | Sakugawa |

(Continued)

FOREIGN PATENT DOCUMENTS

JP 2020-185920 A 11/2020

*Primary Examiner* — Erick R Solis
(74) *Attorney, Agent, or Firm* — Sughrue Mion, PLLC

(57) ABSTRACT

A driving assistance system includes: a first control unit configured to output an output amount related to a required amount; and a second control unit configured to calculate a difference amount between the output amount output and an actually measured amount of an actuator, and control the actuator based on the difference amount and a torque map, in which in assist control (second driving assistance control), the first control unit calculates a difference amount between a second required amount and the actually measured amount, acquires a division amount by dividing the difference amount by a predetermined value, and outputs a total amount of the division amount and the actually measured amount as the output amount, and the second control unit calculates a difference amount between the total amount and the actually measured amount, and controls the actuator based on the difference amount and a second torque map.

3 Claims, 3 Drawing Sheets

(56) References Cited

U.S. PATENT DOCUMENTS

| | | | |
|---|---|---|---|
| 8,818,634 B2 | 8/2014 | Fujita et al. | |
| 9,168,953 B2 | 10/2015 | Mitsumoto et al. | |
| 9,714,034 B2 | 7/2017 | Otake et al. | |
| 9,880,558 B2 | 1/2018 | Nakamura | |
| 9,902,399 B2 | 2/2018 | Torii et al. | |
| 10,345,443 B2 | 7/2019 | Masui et al. | |
| 10,611,240 B2 | 4/2020 | Masui et al. | |
| 2008/0091321 A1* | 4/2008 | Nishikawa | B62D 6/002 701/44 |
| 2018/0015947 A1* | 1/2018 | Akatsuka | B62D 6/008 |
| 2019/0308631 A1* | 10/2019 | Sato | B60W 10/20 |
| 2021/0197890 A1* | 7/2021 | Kim | B62D 6/007 |
| 2021/0214003 A1* | 7/2021 | Watanabe | B62D 5/006 |
| 2022/0144295 A1* | 5/2022 | Hwang | B60W 50/12 |

* cited by examiner

DRIVING ASSISTANCE SYSTEM

TECHNICAL FIELD

The present disclosure relates to a driving assistance system.

BACKGROUND

As a technique related to a driving assistance system, for example, Japanese Unexamined Patent Publication No. 2020-185920 discloses a steering control device that performs calculation so that a difference between target rotation angles (required amounts) used in driving control is gradually decreased toward 0 when the driving control is switched between automatic driving control (first driving assistance control) and manual driving control (second driving assistance control).

SUMMARY

In the technique described above, a torque map that associates a required amount with a torque generated by an actuator may be used for control of the actuator. In this case, when the torque map is different between the first driving assistance control and the second driving assistance control, for example, when the first driving assistance control is switched to the second driving assistance control and a change in the required amount is not synchronized with a change in the torque map, there is a possibility that the torque changes suddenly.

Therefore, an object of one aspect of the present disclosure is to provide a driving assistance system capable of suppressing a sudden change in torque.

A driving assistance system according to one aspect of the present disclosure includes a first control unit configured to output an output amount related to a required amount; and a second control unit configured to calculate a difference amount between the output amount Output from the first control unit and an actually measured amount of an actuator, and control the actuator based on the difference amount and a torque map, wherein the driving assistance system is capable of selectively executing at least one of a first driving assistance control that performs a first driving assistance and a second driving assistance control that performs a second driving assistance different from the first driving assistance, in the first driving assistance control, the first control unit outputs a first required amount as the output amount, and the second control unit calculates a difference amount between the first required amount and the actually measured amount, and controls the actuator based on the difference amount and a first torque map, and in the second driving assistance control, the first control unit calculates a difference amount between a second required amount and the actually measured amount, acquires a division amount by dividing the difference amount by a predetermined value, and outputs a total amount of the division amount and the actually measured amount as the output amount, and the second control unit calculates a difference amount between the total amount and the actually measured amount, and controls the actuator based on the difference amount and a second torque map.

In the driving assistance system according to one aspect of the present disclosure, the second torque map may be a torque map obtained by integrating a reference second torque map with the predetermined value, the reference second torque map associating a torque with the difference amount between the second required amount and the actually measured amount. The required amount may be a required steering angle amount related to a steering angle amount of a vehicle, the actually measured amount may be an actually measured steering angle amount that is an actually measured steering angle amount of the vehicle, the first driving assistance control may be automatic driving control, and the second driving assistance control may be assist control.

According to one aspect of the present disclosure, it is possible to provide a driving assistance system capable of suppressing a sudden change in torque.

DETAILED DESCRIPTION

Hereinafter, preferred embodiments of the present disclosure will be described in detail with reference to the drawings.

Figure 1:
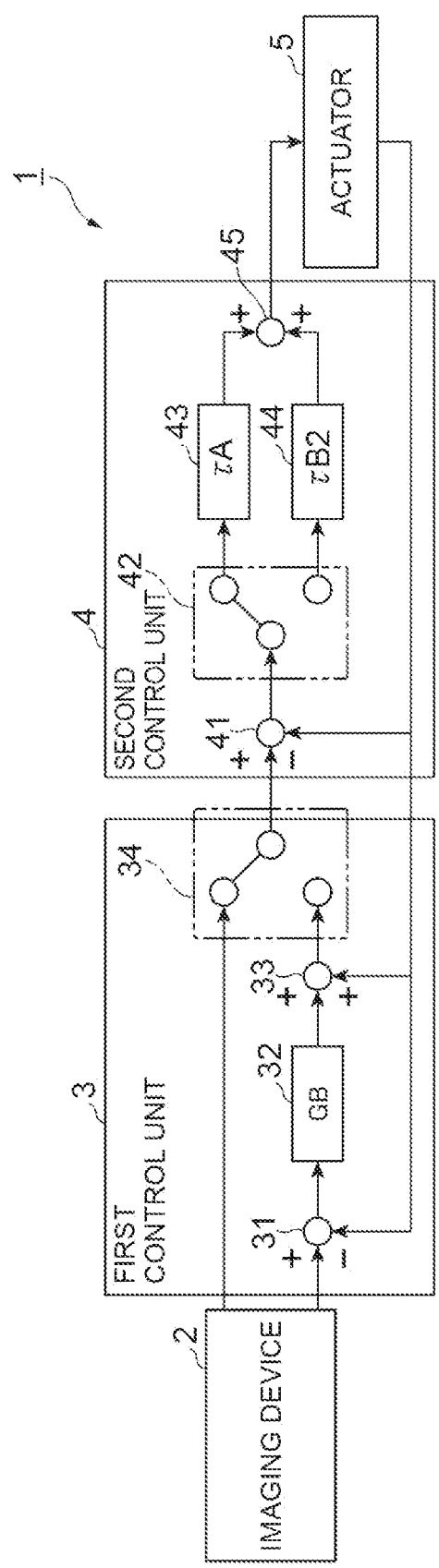
FIG. 1 is a configuration diagram illustrating a driving assistance system according to the present embodiment.

FIG. 1 is a schematic diagram illustrating a driving assistance system according to the present embodiment. A driving assistance system 1 illustrated in FIG. 1 is mounted on a vehicle such as a passenger car, for example, and executes driving assistance control for a driver of the vehicle. The driving assistance system 1 can selectively execute either first driving assistance control for performing first driving assistance or second driving assistance control for performing second driving assistance different from the first driving assistance. In the present embodiment, the first driving assistance control is automatic driving control for performing automatic driving. The second driving assistance control is assist control for assisting driving by the driver.

The automatic driving control is vehicle control in which a vehicle automatically travels toward a preset destination. In the automatic driving control, the vehicle travels automatically without the driver performing a driving operation. The assist control is vehicle control for assisting a driving operation by a driver. In the present embodiment, steering by the driver is assisted in the assist control.

The driver can switch between the automatic driving control and the assist control. For example, the driver can select whether to cause the driving assistance system 1 to execute the automatic driving control without performing the driving operation by himself/herself or to cause the driving assistance system 1 to execute the assist control for receiving assistance of the driving operation while performing the driving operation by himself/herself according to a situation during traveling or the like.

In the automatic driving control and the assist control according to the present embodiment, lane keeping control for suppressing deviation of the vehicle from a traveling lane is performed. In the lane keeping control, for example, when the vehicle approaches a left or right dividing line of the traveling lane, a torque is generated by an actuator 5 of the vehicle so that the vehicle returns to a center side of the traveling lane. The driving assistance system 1 acquires a steering angle amount required for returning to the center side of the traveling lane or the like, and causes the actuator 5 to generate a torque according to the required amount. The torque corresponding to the steering angle amount required at the time of execution of the automatic driving control is larger than a torque corresponding to a steering angle amount required at the time of execution of the assist control. Therefore, the followability of the steering angle amount of the vehicle with respect to the steering angle amount required at the time of execution of the automatic driving control is larger than the followability of the steering angle amount of the vehicle with respect to the steering angle amount required at the time of execution of the assist control. The driving assistance system 1 includes an imaging device 2, a first control unit 3, a second control unit 4, and the actuator 5.

The imaging device 2 is imaging equipment that images an external situation of the vehicle. The imaging device 2 is provided, for example, on a back side of a windshield of the vehicle and images the front of the vehicle. The imaging device 2 outputs imaging information regarding the external situation of the vehicle to the first control unit 3. The imaging information is, for example, information regarding a distance between the dividing line of the traveling lane and the vehicle, a curvature of a road, and a direction of the vehicle (yaw angle). The imaging device 2 may be a monocular camera or a stereo camera. An application for acquiring the imaging information may be mounted on the imaging device 2.

The first control unit 3 and the second control unit 4 are electronic control units including a central processing unit (CPU), a read only memory (ROM), a random access memory (RAM), and the like. The first control unit 3 and the second control unit 4 implement various functions by, for example, loading a program stored in the ROM into the RAM and executing the program loaded in the RAM by the CPU. Each of the first control unit 3 and the second control unit 4 may include a plurality of electronic units.

The first control unit 3 acquires the imaging information from the imaging device 2. The first control unit 3 acquires a required amount required for the driving assistance control based on the imaging information. In the present embodiment, the required amount is a required steering angle amount related to a steering angle amount of the vehicle. The required steering angle amount is, for example, a steering angle amount of the vehicle required according to the external situation. In the present embodiment, the first control unit 3 acquires a first required amount and a second required amount. The first required amount is a required amount acquired by the first control unit 3 at the time of execution of the automatic driving control. The second required amount is a required amount acquired by the first control unit 3 at the time of execution of the assist control. The first control unit 3 outputs an output amount related to the required amount to the second control unit 4. The output amount will be described later.

The second control unit 4 acquires an actually measured amount of the actuator 5. In the present embodiment, the actually measured amount is an actually measured steering angle amount that is an actually measured steering angle amount of the vehicle. The second control unit 4 acquires the actually measured amount by, for example, a torque sensor. The second control unit 4 calculates a difference amount (Hereinafter, it may be simply referred to as "output difference amount".) between the output amount output from the first control unit 3 and the actually measured amount. The second control unit 4 controls the actuator 5 based on the output difference amount and a torque map. The torque map is a control map that associates a torque generated by the actuator 5 with the output difference amount.

The actuator 5 is equipment used for controlling the vehicle. In the present embodiment, the actuator 5 is a steering actuator. The steering actuator controls driving of an assist motor (not illustrated) that applies torque in accordance with a control signal from the second control unit 4. As a result, the steering actuator controls the torque of the vehicle.

In the present embodiment, the actuator 5 controls a drive amount of the assist motor. For example, the driving assistance system 1 converts linear motion caused by driving of the assist motor into rotational motion via a rack and pinion mechanism. The rack and pinion mechanism includes, for example, a steering shaft on which a rack is formed and a pinion shaft on which a pinion is formed. The pinion shaft is connected to, for example, a steering shaft rotatably supported by a steering column, and transmits the rotational motion to the steering shaft and a steering wheel connected to the steering shaft.

The first control unit 3 includes a first subtractor 31, a divider 32, an adder 33, and a first switching unit 34. The first subtractor 31 calculates a difference amount (Hereinafter, it may be simply referred to as "required difference amount") between the second required amount based on the imaging information acquired from the imaging device 2 and the actually measured amount, and outputs the required difference amount to the divider 32. The divider 32 acquires a division amount by dividing the required difference amount by a predetermined value, and outputs the division amount to the adder 33. The predetermined value is a real number larger than 1, and is 10 as an example. A method of determining the predetermined value will be described later.

The adder 33 acquires an actually measured amount from the actuator 5. The adder 33 calculates a total amount of the division amount and the actually measured amount, and outputs the total amount to the second control unit 4 as an output amount. The first switching unit 34 switches an output amount to be output to the second control unit 4. In the present embodiment, the first switching unit 34 switches which of the first required amount and the total amount is to be output to the second control unit 4 as the output amount.

The second control unit 4 includes a second subtractor 41, a second switching unit 42, a first torque calculation unit 43, a second torque calculation unit 44, and a torque Output unit 45. Furthermore, the second control unit 4 stores, as the torque map, a first torque map used when the automatic driving control is executed and a second torque map used when the assist control is executed.

The second subtractor 41 acquires the actually measured amount from the actuator 5. The second subtractor 41 calculates the output difference amount. The second switching unit 42 switches an output destination of the calculated output difference amount between the first torque calculation unit 43 and the second torque calculation unit 44. The first torque calculation unit 43 stores the first torque map. The first torque calculation unit 43 calculates a torque to be generated by the actuator 5 based on the output difference amount and the first torque map, and outputs a calculation result to the torque output unit 45. The second torque calculation unit 44 stores the second torque map. The second torque calculation unit 44 calculates a torque to be generated by the actuator 5 based on the output difference amount and the second torque map, and outputs a calculation result to the torque output unit 45. The torque output unit 45 outputs either the calculation result of the first torque calculation unit 43 or the calculation result of the second torque calculation unit 44 to the actuator 5, and causes the actuator 5 to generate a torque related to the calculation result.

The second torque map is a torque map obtained by integrating a reference second torque map with the above-described predetermined value. The reference second torque map is a torque map that associates a torque with a difference amount between the second required amount and the actually measured amount. A second torque gain, which is a torque gain in the second torque map, is a value obtained by integrating a reference second torque gain, which is a torque gain in the reference second torque map, with a predetermined value. In the present embodiment, a first torque gain which is a torque gain of the first torque map is substantially equal to the second torque gain. As an example, the predetermined value is determined such that the first torque gain and the second torque gain are equal to each other. In other words, the predetermined value may be a value obtained by dividing the first torque gain by the reference second torque gain. Assuming that the first torque gain is $\tau A$, the second torque gain is $\tau B2$, the reference second torque gain is $\tau B$, and the above-described predetermined value is $GB$, the following Formulas (1) to (3) may be satisfied.

$$\tau A >> \tau B \quad (1),$$

$$\tau A \approx \tau B2 \quad (2),$$

$$GB \approx \tau A / \tau B \quad (3)$$

In the automatic driving control, the first control unit 3 switches the first switching unit 34 so as to output the first required amount as the output amount. The second control unit 4 switches the second switching unit 42 so as to associate the output difference amount with the first torque map. As a result, the first control unit 3 outputs the first required amount as the output amount to the second control unit 4. The second control unit 4 calculates the output difference amount that is a difference amount between the first required amount (output amount) and the actually measured amount, and calculates a torque to be generated by the actuator based on the output difference amount and the first torque map. Then, the second control unit 4 causes the actuator 5 to generate the torque.

In the assist control, the first control unit 3 switches the first switching unit 34 so as to output the total amount as the output amount. The second control unit 4 switches the second switching unit 42 so as to associate the output difference amount with the second torque map. As a result, the first control unit 3 calculates the required difference amount between the second required amount and the actually measured amount, and acquires the division amount by dividing the required difference amount by a predetermined value. The first control unit 3 outputs the total amount of the division amount and the actually measured amount to the second control unit 4 as an output amount. The second control unit 4 calculates the output difference amount that is a difference amount between the total amount and the actually measured amount, and calculates a torque generated by the actuator 5 based on the output difference amount and the second torque map. Then, the second control unit 4 causes the actuator 5 to generate the torque.

Next, functions and effects of the driving assistance system 1 according to the present embodiment will be described.

Figure 2A:
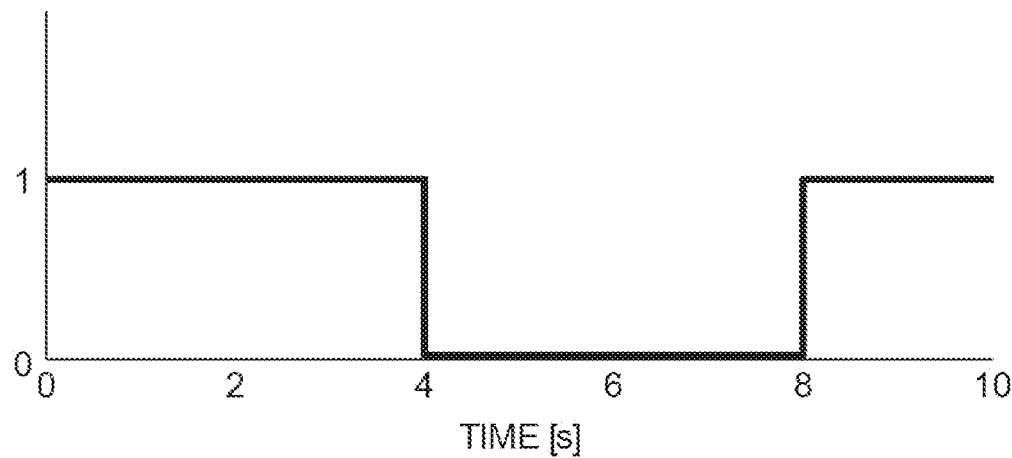
FIG. 2A is a timing chart illustrating an example of switching timing of driving assistance control.

FIG. 2A is a timing chart illustrating an example of switching timing of driving assistance control. In the example of FIG. 2A, the execution timing of the automatic driving control is indicated by "1", and the execution timing of the assist control is indicated by "0". That is, the example of FIG. 2A, FIG. 2B, and FIG. 2C illustrates a state in which the driving assistance system 1 switches from the automatic driving control to the assist control four seconds after a predetermined time serving as a reference, and switches from the assist control to the automatic driving control eight seconds after the predetermined time.

Figure 2B:
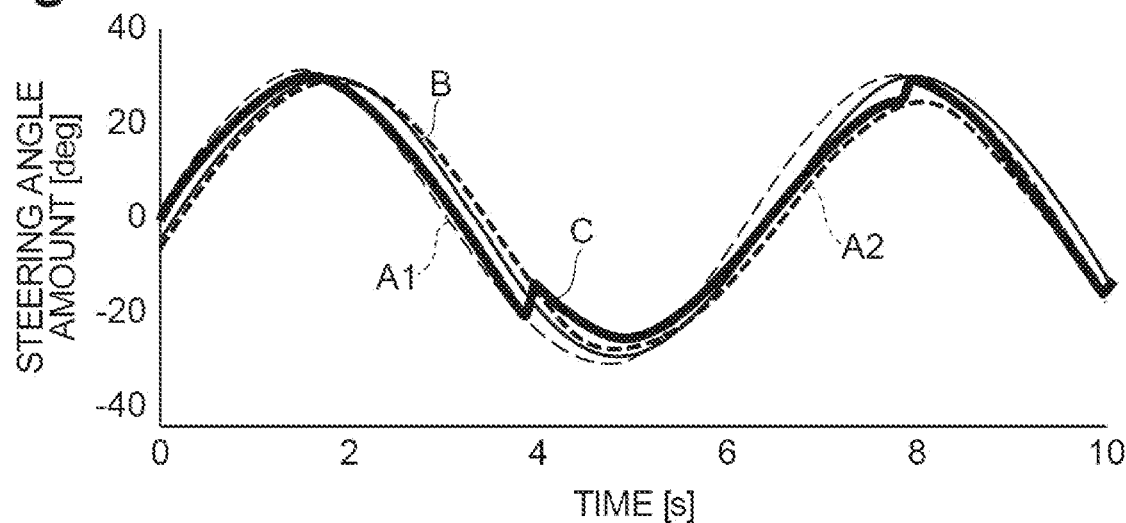
FIG. 2B is a graph illustrating an example of a temporal change in a steering angle amount.

FIG. 2B is a graph illustrating an example of a temporal change in a steering angle amount. In the example of FIG. 2B, the output amount (first required amount) output from the first control unit 3 to the second control unit 4 at the time of execution of the automatic driving control is illustrated by a thin broken line graph A1. Furthermore, the output amount (total amount) output from the first control unit 3 to the second control unit 4 at the time of execution of the assist control is illustrated by a thick broken line graph A2. Furthermore, the actually measured amount is illustrated by a thin solid line graph B. Moreover, the output amount output from the first control unit 3 to the second control unit 4 is illustrated by a thick solid line graph C.

The driving assistance system 1 includes a so-called servo mechanism. In the servo mechanism, a difference between the actually measured amount and the required amount becomes smaller as the torque gain of the torque map is larger, and the difference between the actually measured amount and the required amount becomes larger as the torque gain of the torque map is smaller. Therefore, as illustrated in FIG. 2B, the first required amount substantially matches the actually measured amount. The followability of the actually measured amount with respect to the first required amount is larger than the followability of the actually measured amount with respect to the second required amount.

Figure 2C:
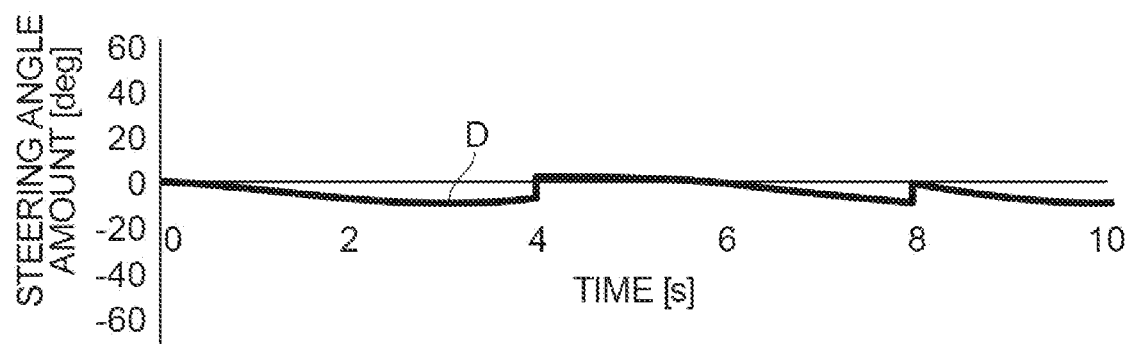
FIG. 2C is a graph illustrating an example of a temporal change of a steering angle difference that is a difference amount between an Output amount and an actually measured amount.

FIG. 2C is a graph illustrating an example of a temporal change of a steering angle difference that is a difference amount between an output amount and an actually measured amount. In the example of FIG. 2C, a graph D illustrates a difference amount between the output amount output from the first control unit 3 to the second control unit 4 and the actually measured amount.

Figure 3A:
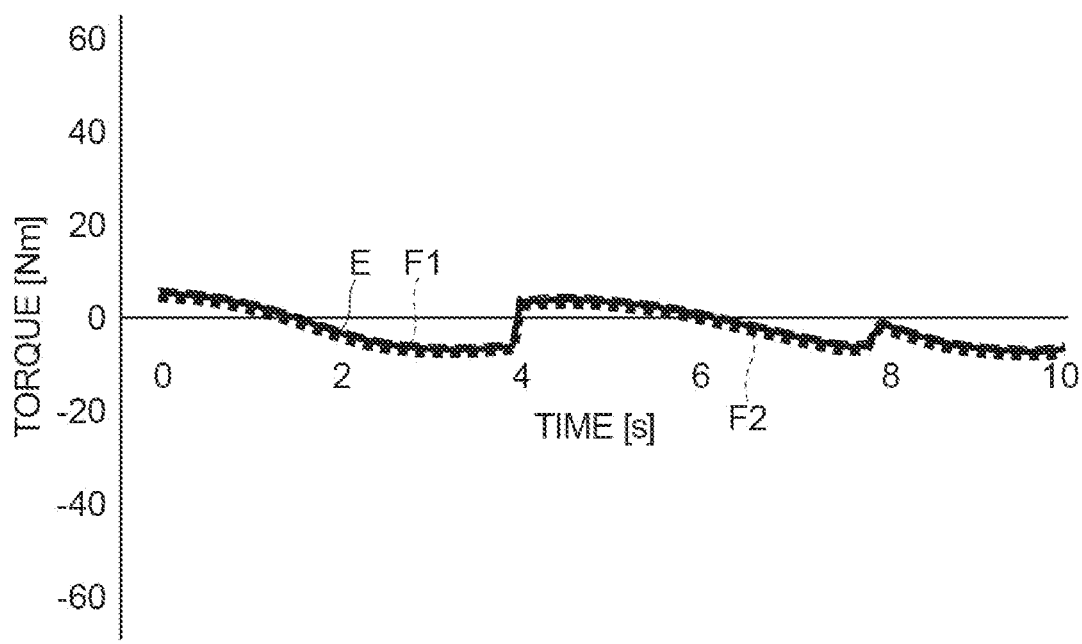
FIG. 3A is a graph illustrating a temporal change in torque generated by an actuator in the driving assistance system according to the present embodiment.
Figure 3B:
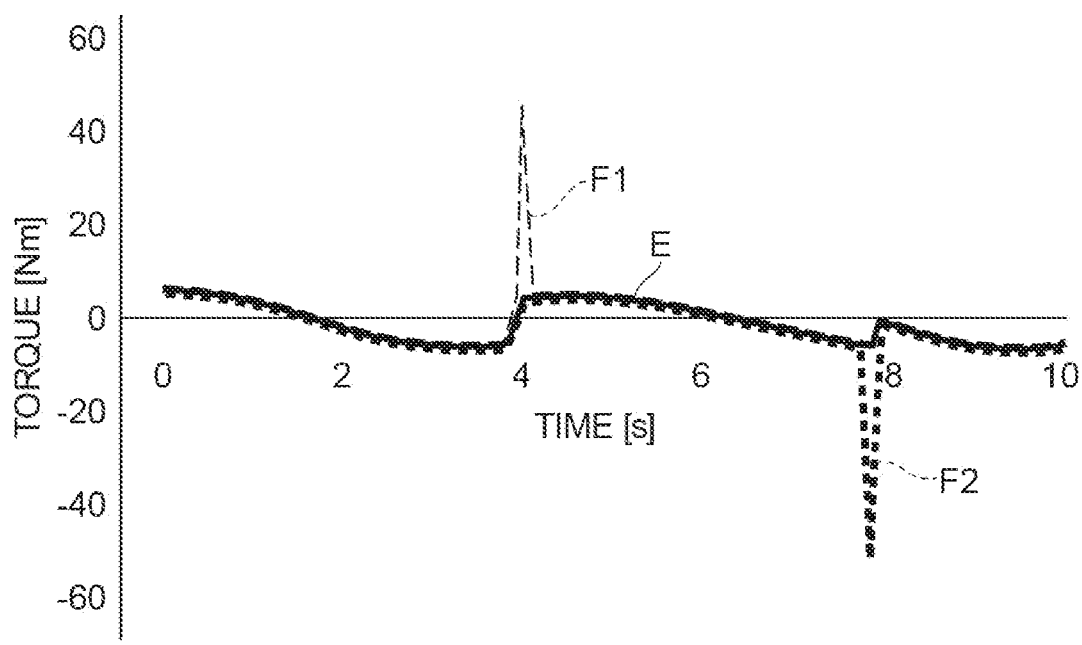
FIG. 3B is a graph illustrating a temporal change in torque generated by an actuator in a driving assistance system according to a comparative example.

FIG. 3A is a graph illustrating a temporal change in torque generated by the actuator in the driving assistance system according to the present embodiment. FIG. 3B is a graph illustrating a temporal change in torque generated by an actuator in a driving assistance system according to a comparative example. In the example of FIG. 3A and FIG. 3B, a torque generated by the actuator 5 when the switching of the first switching unit 34 and the switching of the second switching unit 42 are synchronized with each other is illustrated by a thick solid line graph E. Furthermore, a torque generated by the actuator 5 when the switching of the second switching unit 42 is delayed with respect to the switching of the first switching unit 34 is illustrated by a thin broken line graph F1. Moreover, a torque generated by the actuator 5 when the switching of the first switching unit 34 is delayed with respect to the switching of the second switching unit 42 is illustrated by a thick broken line graph F2.

When switching the driving assistance control, it is ideal that the switching of the first switching unit 34 and the switching of the second switching unit 42 are synchronized with each other. However, practically, for example, due to flattening processing of the required amount (processing of gradually increasing or gradually decreasing the required amount when switching the first switching unit 34), a communication delay between the first control unit 3 and the second control unit 4, and the like, there is a possibility that one of the switching of the first switching unit 34 and the switching of the second switching unit 42 is delayed with respect to the other.

In the driving assistance system 1 according to the present embodiment, at the time of execution of the assist control, the first control unit 3 outputs the total amount to the second control unit 4 as the output amount. In this case, as illustrated in FIG. 2B, the difference between the output amount and the actually measured amount becomes small as compared with the case where the second required amount is output to the second control unit 4 as the output amount. In other words, the followability of the actually measured amount with respect to the output amount at the time of execution of the assist control can be improved. As a result, it is possible to reduce the difference between the output amount (first required amount) at the time of executing the automatic driving control and the output amount (total amount) at the time of executing the assist control. Therefore, even when the switching of the first switching unit 34 and the switching of the second switching unit 42 are not synchronized with each other, it is possible to suppress a sudden change in the output amount to the second control unit 4 before and after the switching of the driving assistance control. As a result, as illustrated in FIG. 2C, it is possible to suppress a sudden change in the difference amount (output difference amount) between the output amount and the actually measured amount. Then, the torque generated by the actuator 5 is associated with the output difference amount by the torque map. Therefore, as illustrated in FIG. 3A, it is possible to suppress a sudden change in torque generated when the driving assistance control is switched.

In the driving assistance system 1 according to the present embodiment, the second torque map is a torque map obtained by integrating the reference second torque map that associates a torque with the difference amount between the second required amount and the actually measured amount with a predetermined value. In this case, the reference second torque map is integrated with a predetermined value to obtain the second torque map in response to the first control unit 3 dividing the difference amount between the second required amount and the actually measured amount by the predetermined value. As a result, even when the output amount to the second control unit 4 at the time of execution of the assist control is changed, a change in the torque generated by the actuator 5 can be suppressed.

In the driving assistance system 1 according to the present embodiment, the required amount is a required steering angle amount related to a steering angle amount of the vehicle, and the actually measured amount is an actually measured steering angle amount that is an actually measured steering angle amount of the vehicle. In the driving assistance system 1, the first driving assistance control is automatic driving control, and the second driving assistance control is assist control. In this case, even when the control executed between the automatic driving control and the assist control is switched to each other, it is possible to suppress a sudden change in the steering angle amount of the vehicle.

Next, a driving assistance system according to a comparative example will be described. In the following description, a description overlapping with the driving assistance system 1 will be omitted as appropriate. In the driving assistance system according to the comparative example, a first control unit does not include the first subtractor 31, the divider 32, and the adder 33. At the time of execution of the assist control, the first control unit outputs a second required amount to a second control unit as an output amount. Furthermore, a first torque gain and a second torque gain are different from each other. Specifically, the second torque gain is smaller than the first torque gain. For example, the second torque gain is a value obtained by dividing the first torque gain by the above-described predetermined value.

When the switching of a second switching unit is delayed with respect to the switching of a first switching unit in switching the (hiving assistance control, the first control unit outputs the second required amount to the second control unit as the output amount. On the other hand, the second control unit associates the output difference amount with a first torque map. At this time, when the driving assistance control is switched at timing when the first required amount and the second required amount are different from each other, the output amount output to the second control unit suddenly changes. Then, as a result of the sudden change in the output amount to the second control unit, a difference amount (output difference amount) between the output amount and the actually measured amount suddenly changes. In addition, the first torque gain is larger than the second torque gain. Therefore, as indicated by the graph F1 in FIG. 3B, a torque generated by the actuator suddenly increases.

When the switching of the first switching unit is delayed with respect to the switching of the second switching unit in switching the driving assistance control, the first control unit outputs the first required amount to the second control unit as the output amount. On the other hand, the second control unit associates the output difference amount with a second torque map. At this time, when the driving assistance control is switched at timing when the first required amount and the second required amount are different from each other, the output amount output to the second control unit suddenly changes, and the output difference amount also suddenly changes. In addition, the second torque gain is smaller than the first torque gain. Therefore, as indicated by the graph F2 in FIG. 3B, a torque generated by the actuator suddenly decreases. In contrast to such a driving assistance system according to the comparative example, in the present embodiment, as described above, a sudden change in the output difference amount can be suppressed, and a sudden change in the torque generated by the actuator 5 can be suppressed. Therefore, the driving assistance system 1 according to the present embodiment is effective.

Although various exemplary embodiments have been described above, various omissions, substitutions, and changes may be made without being limited to the above-described exemplary embodiments.

In the above embodiment, the example in which the driving assistance system 1 is applied to a vehicle has been described. However, the driving assistance system 1 is applicable not only to vehicles but also to various systems. The system may be, for example, a system including two arithmetic devices capable of communicating with each other, in which each of the two arithmetic devices has two or more functions and there is a possibility that the two or more functions are switched. In this case, it may be necessary to smoothly change a command value when an output of the other arithmetic device changes according to a command value output from the one arithmetic device and the function of the one arithmetic device is switched.

In the above embodiment, the example in which the actuator 5 is a steering actuator has been described. The actuator 5 only needs to perform predetermined control in accordance with a control signal from the second control unit 4. For example, the actuator 5 may be an accelerator actuator that controls an accelerator amount of a vehicle or a brake actuator that controls a brake amount of the vehicle. Also in a powertrain, when two or more functions are provided and these functions are switched, one aspect of the present disclosure can be applied. In the above embodiment, the imaging device 2 and the first control unit 3 may be realized by the same device configuration. In the above embodiment, the second control unit 4 and the assist motor may be realized by the same device configuration.

What is claimed is:

1. A driving assistance system comprising:
a first control unit configured to output an output amount related to a required amount; and
a second control unit configured to calculate a difference amount between the output amount output from the first control unit and an actually measured amount of an actuator, and control the actuator based on the difference amount and a torque map,
wherein the driving assistance system is capable of selectively executing at least one of a first driving assistance control that performs a first driving assistance and a second driving assistance control that performs a second driving assistance different from the first driving assistance,
in the first driving assistance control,
the first control unit outputs a first required amount as the output amount, and
the second control unit calculates a difference amount between the first required amount and the actually measured amount, and controls the actuator based on the difference amount and a first torque map, and
in the second driving assistance control,
the first control unit calculates a difference amount between a second required amount and the actually measured amount, acquires a division amount by dividing the difference amount by a predetermined value, and outputs a total amount of the division amount and the actually measured amount as the output amount, and
the second control unit calculates a difference amount between the total amount and the actually measured amount, and controls the actuator based on the difference amount and a second torque map.

2. The driving assistance system according to claim 1, wherein the second torque map is a torque map obtained by integrating a reference second torque map with the predetermined value, the reference second torque map associating a torque with the difference amount between the second required amount and the actually measured amount.

3. The driving assistance system according to claim 2, wherein
the required amount is a required steering angle amount related to a steering angle amount of a vehicle,
the actually measured amount is an actually measured steering angle amount that is an actually measured steering angle amount of the vehicle,
the first driving assistance control is automatic driving control, and
the second driving assistance control is assist control.

* * * * *